J. W. LEDOUX.
MECHANISM FOR COMBINING LIQUIDS.
APPLICATION FILED OCT. 26, 1911.
1,085,348.
Patented Jan. 27, 1914.
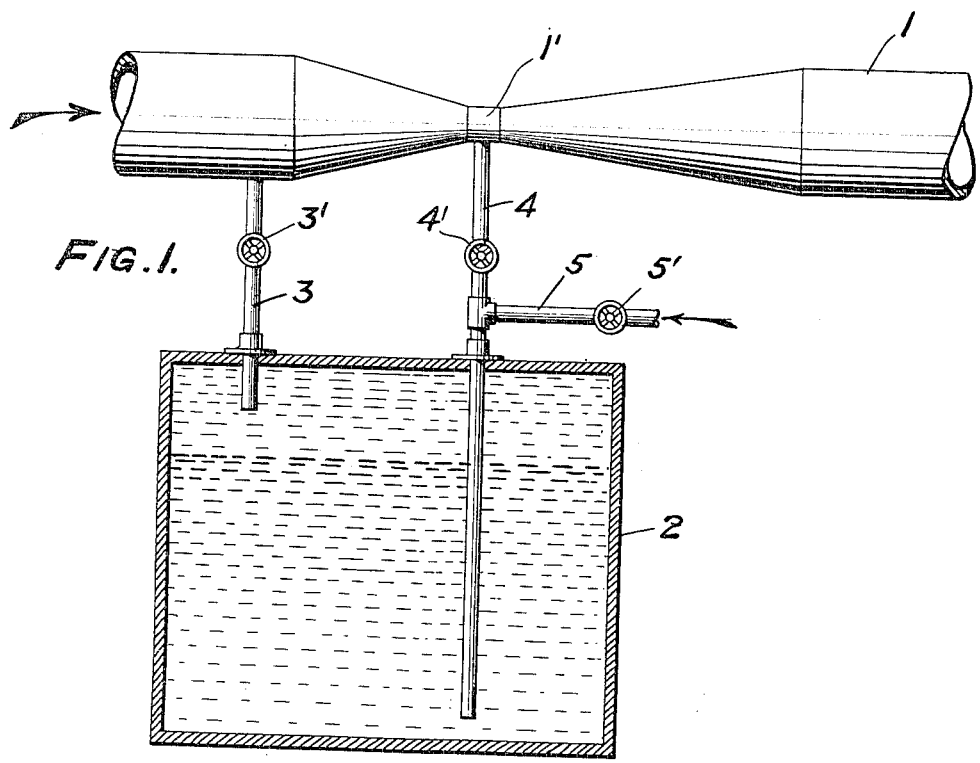
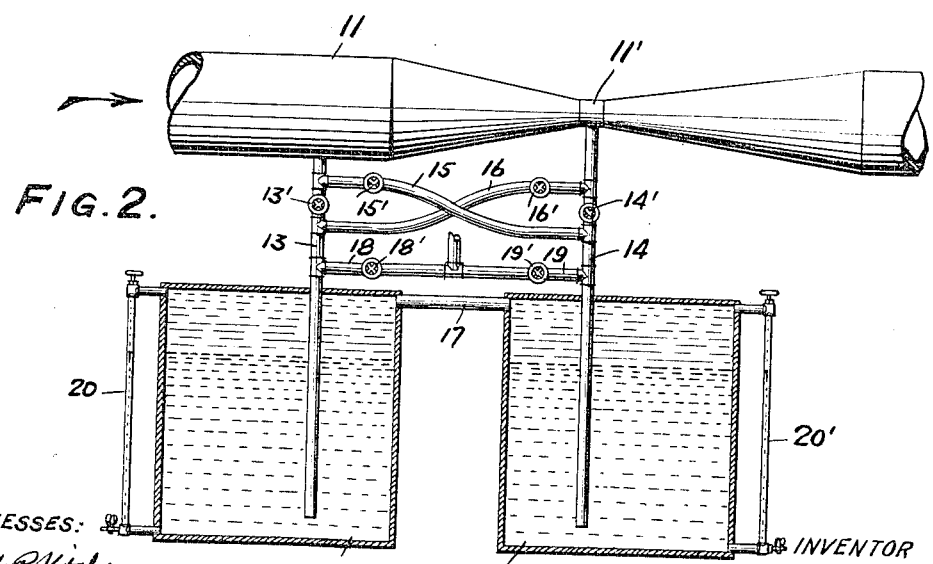
WITNESSES:
INVENTOR
John W. Ledoux
BY Charles N. Butler,
ATTORNEY.

UNITED STATES PATENT OFFICE.

JOHN W. LEDOUX, OF SWARTHMORE, PENNSYLVANIA.

MECHANISM FOR COMBINING LIQUIDS.

1,085,348.  Specification of Letters Patent.  Patented Jan. 27, 1914.

Application filed October 26, 1911. Serial No. 656,814.

*To all whom it may concern:*

Be it known that I, JOHN W. LEDOUX, a citizen of the United States, residing at Swarthmore, in the county of Delaware and State of Pennsylvania, have invented Mechanism for Combining Liquids, of which the following is a specification.

My invention is designed primarily for impregnating flowing water with a coagulating or sterilizing solution introduced at a rate varying with the rate of flow of the water so that the two liquids shall be mixed in the desired ratio regardless of such rate of flow, but it will be understood that it is applicable to more general use, for the purpose of combining fluids in definite proportions.

It has been proposed to impregnate water flowing in a conduit with substances carried thereto by gravity with regulation of the proportion of such substances to a greater or less degree by differential pressure mechanisms of various kinds, but such proposed modes of operation do not effect the desired proportional combination and involve the use of mechanism that is comparatively complicated and expensive as well as inaccurate.

In my improved mode of operation, in the preferred form, I employ an impregnating solution having a specific gravity slightly greater than that of the water or other fluid to be impregnated, the impregnating solution is stored so that it cannot be discharged by gravity, and a contracted and normal section of a conduit containing the fluid to be impregnated are respectively connected with a lower and higher part of a vessel containing the solution so that there shall be no solution delivered to the water when the latter is quiescent and as the flow of water rises from zero to the maximum a proportionate part of the solution shall be delivered thereto by the resultant pressure due to the differentiation effected by the contracted conduit section. It is also designed to connect each of the different sections of the conduit alternately with the lower levels of two connected vessels which are alternately charged with the impregnating solution, the vessel containing the solution being connected with the contracted section of the conduit while the other vessel is connected with the normal conduit section and receives water which is separated from the solution by a liquid such as oil.

The characteristic features of my invention are more fully disclosed in the following description and the accompanying drawings in illustration thereof.

In the drawings, Figure 1 is an elevation, partly in section, of mechanism used in the practice of my invention; and Fig. 2 is an elevation, partly in section, representing a second form of such apparatus.

As illustrated in Fig. 1, a conduit 1, having a Venturi section 1', is connected with a lower closed vessel 2 by a pipe 3, containing a valve 3', which connects a normal section of the conduit with the top or upper part of the vessel, and by a pipe 4, containing a valve 4', which connects the contracted or Venturi section of the conduit with the bottom or lower part of the vessel. A pipe 5, containing a valve 5', is connected with the pipe 4, between the vessel 2 and the valve 4', for the purpose of introducing the solution to the bottom of the vessel.

The vessel 2 being provided with the solution, sufficient to maintain the bottom of the pipe 4 covered, the valves 3' and 4' being open to the desired amount and the valve 5' being closed, such solution will be carried up through the pipe 4 into the conduit at a rate bearing a substantially constant ratio to the rate of flow of water in the conduit, for it will be understood that when there is no flow in the conduit the water pressures communicated therefrom through the pipes 3 and 4 to the solution within and without the pipe 4 are equal, so that such solution will stand at the same level within and without such pipe, but as the velocity of the water in the conduit rises from zero to the maximum, the difference between the water pressures at the normal and contracted sections will increase therewith from zero to the maximum, whereby the solution will be carried through the pipe 4 and mixed with water in the conduit. It should be understood that a small amount of a solution, such as alum or hypochlorite of calcium or sulfate of aluminum or sulfate of iron, so introduced to water flowing in the conduit will mix with such water to effect the desired coagulation or sterilization, while water introduced to the top of the vessel and collecting in a body on the body of the solution will mix to but a slight extent and within a limited zone.

As illustrated in Fig. 2, a conduit 11, having a Venturi section 11', is connected with the lower closed vessels 12 and 12', by the pipe 13 which connects a normal section of the conduit with the bottom of the vessel 12 and a pipe 14 which connects the contracted or Venturi section of the conduit with the bottom of the vessel 12'. The crossed pipes 15 and 16 connect the pipes 13 and 14, a valve 13' is placed in the pipe 13 between its connections with the pipes 15 and 16, a valve 14' is placed in the pipe 14 between its connections with the pipes 15 and 16, and valves 15' and 16' are placed in the respective pipes 15 and 16. A pipe 17 connects the tops of the vessels 12 and 12'. A pipe 18, containing the valve 18', is connected with the pipe 13, for the purpose of introducing solution therethrough to the bottom of the vessel 12, and a pipe 19, containing the valve 19', is connected with the pipe 14, for the purpose of introducing solution therethrough to the bottom of the vessel 12'. Sight glasses 20 and 20' are placed upon the respective vessels to show the liquid level therein.

By the foregoing arrangement, a normal section of the conduit can be connected with the bottom of either of the vessels and the contracted section of the conduit connected with the bottom of the other vessel, and the impregnating solution in the vessel connected with the contracted section can be separated from water delivered from the normal section by oil which can be forced by the higher water pressure through the pipe 17 and used to force solution into the water flowing in the conduit.

Having described my invention, I claim:

1. The improvements for impregnating a flowing liquid with a quantity of a second liquid proportional to the rate of flow of the flowing liquid which comprises the combination with a conduit for carrying the flowing liquid, of means for containing a store of the second liquid; means connecting the same with a section of said conduit so that said second liquid cannot flow by gravity into said conduit and the upper surface thereof shall be subject to pressure communicated from said flowing liquid, and means for connecting said store with a section of said conduit whereby the pressure is reduced by the velocity head so that it is lower than the pressure at said first named section.

2. The improvements for impregnating a flowing liquid with a quantity of a second liquid proportional to the rate of flow of the flowing liquid, which comprise the combination of a conduit having a contracted section for carrying the flowing liquid, a vessel for holding a store of the second liquid below said conduit, means for connecting the contracted section of said conduit with the interior of said vessel below the normal level of said second liquid therein and means for connecting a larger section of said conduit with the interior of said vessel above the normal level of said second liquid therein, whereby different pressures at said different sections of said conduit effect the delivery of said second liquid to said flowing liquid.

3. The improvements for impregnating a flowing liquid with a quantity of a second liquid proportional to the rate of flow of said flowing liquid, which comprises the combination of a conduit having a Venturi section therein for differentiating the pressure of said flowing liquid, a vessel for holding the second liquid below said conduit, and means whereby said vessel is connected with said conduit and said second liquid is carried from said vessel into said Venturi section by the differential pressures caused by said flowing liquid without being carried into said conduit when there is no flow therein.

4. The improvements for mixing fluids which comprise a conduit, a pair of storage vessels, means for connecting said vessels, pipes connecting said conduit with the respective vessels, crossed pipes connecting the pipes aforesaid and means for compelling flow from each of said first named pipes to the other of said first named pipes through a crossed pipe.

In witness whereof I have hereunto set my name this 24th day of October, 1911, in the presence of the subscribing witnesses.

JOHN W. LEDOUX.

Witnesses:
Jos. G. Denny, Jr.,
Charles N. Butler.